Sept. 2, 1924.
J. H. HUNT
1,507,314
FUEL DISTRIBUTING SYSTEM
Filed June 28, 1920
3 Sheets-Sheet 2
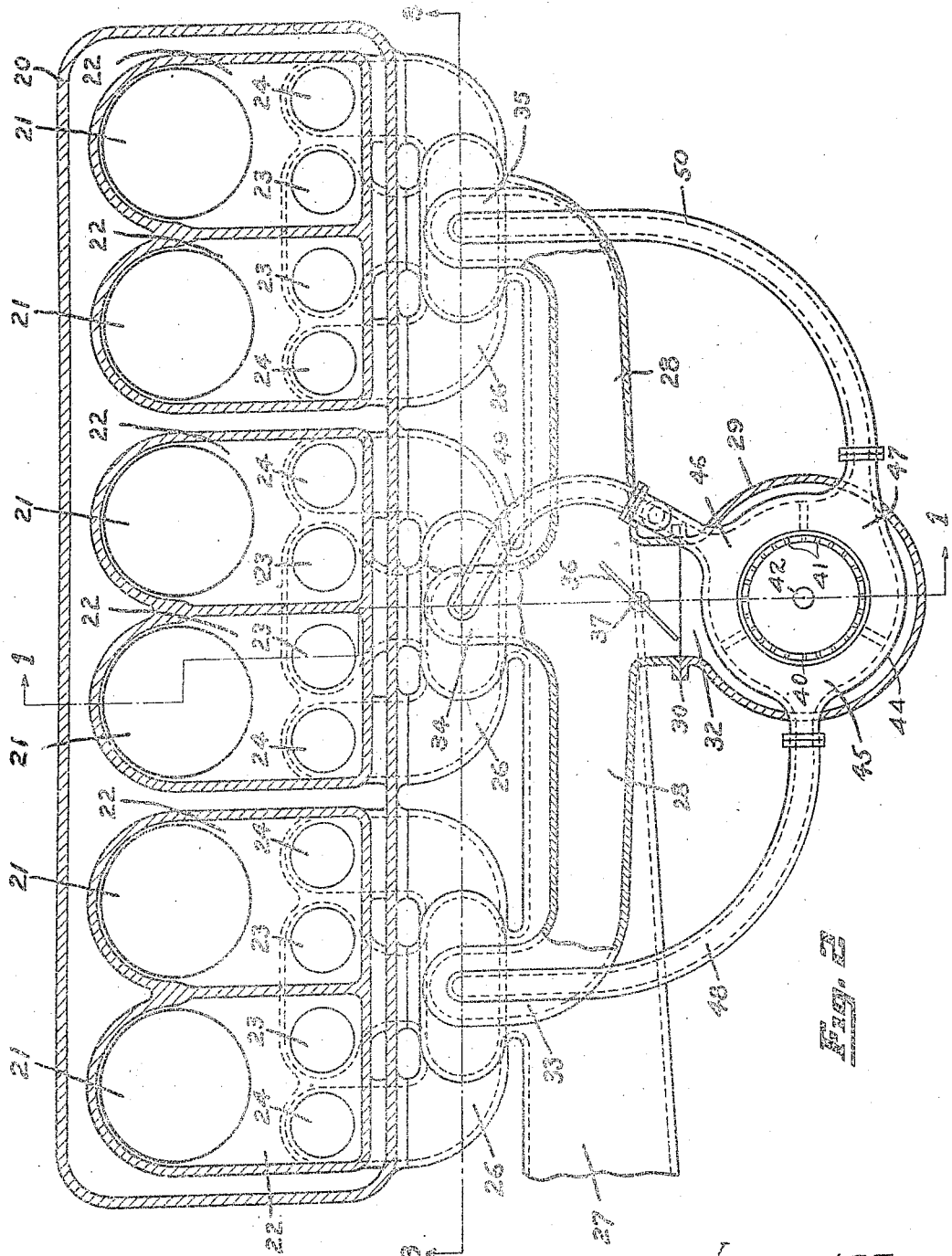

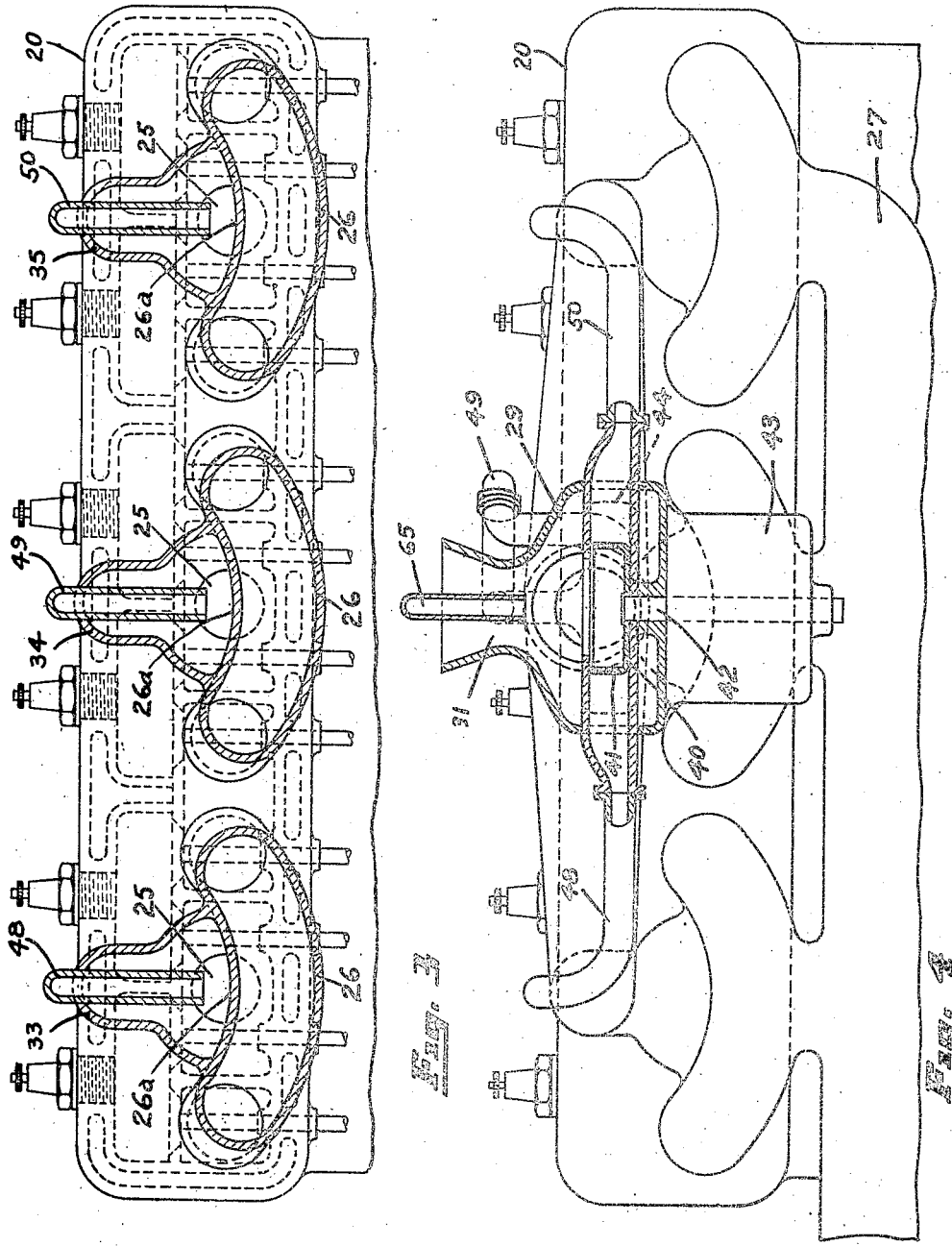

Patented Sept. 2, 1924.

1,507,314

UNITED STATES PATENT OFFICE.

JOHN H. HUNT, OF DAYTON, OHIO, ASSIGNOR TO THE DAYTON ENGINEERING LABORATORIES COMPANY, OF DAYTON, OHIO, A CORPORATION OF OHIO.

FUEL-DISTRIBUTING SYSTEM.

Application filed June 28, 1920. Serial No. 393,343.

*To all whom it may concern:*

Be it known that I, JOHN H. HUNT, a citizen of the United States of America, residing at Dayton, county of Montgomery, and State of Ohio, have invented certain new and useful Improvements in Fuel-Distributing Systems, of which the following is a full, clear, and exact description.

This invention relates to the distribution of fuels to multi-cylinder internal-combustion engines, and particularly to the distribution of the heavier or less volatile fuels such for example as kerosene.

The principal objects of the invention are to provide for an equal distribution of the fuel to the cylinders of a multicylinder engine and to vaporize the fuel which ordinarily is not evaporated upon contact with the air.

Briefly stated my invention comprises a comminuting of the liquid fuel, then heating it and finally completing the vaporizing of the liquid portion under reduced atmospheric pressure, and an equal distribution of the comminuted fuel to the engine cylinders.

Other objects and advantages of the present invention will be apparent from the foregoing description, reference being had to the accompanying drawings, wherein a preferred embodiment of the present invention is clearly shown.

In the drawings:

Fig. 2 is a sectional view taken approximately on the line 2—2 of Fig. 1;

Fig. 3 is a sectional view taken on the line 3—3 of Fig. 2; and

Fig. 4 is a fragmentary side elevation of the internal-combustion engine together with certain parts shown in Fig. 1, a section being taken on the line 4—4 of Fig. 1.

Figure 1:
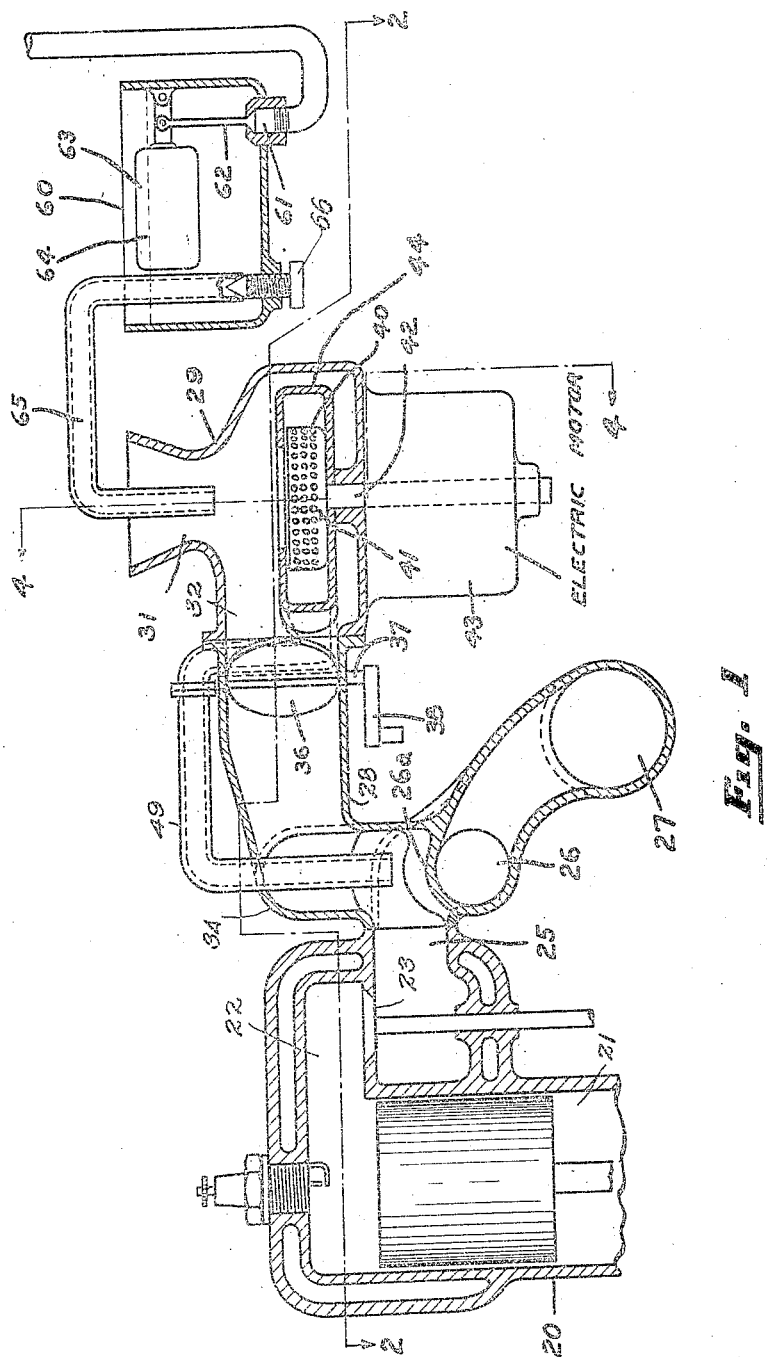
Fig. 1 is a sectional view of an engine together with apparatus embodying the present invention, the section of certain parts shown in Fig. 1, being taken approximately on the line 1—1 of Fig. 2.

Referring to the drawings, an internal-combustion engine 20 is provided with a plurality of cylinders 21 each communicating with a combustion chamber 22. Each chamber 22 is controlled by an intake valve 23 and an exhaust valve 24. Each pair of adjacent intake valves 23 controls the admission of fuel mixture from an engine intake passage 25. The exhaust valves 24 of each pair of cylinders 21 control the admission of exhaust gas into the Y-shaped portions 26 leading into an exhaust header 27. The upper surface of each of the Y-shaped portions 26 is concaved to provide a fuel vaporizing bowl 26ª forming the bottom wall of a portion of an air-manifold 28 which is arranged to be in contact with the exhaust gases.

Manifold 28 is provided with a fuel distributor housing 29 which may be formed integrally therewith or may be constructed separately and joined to the manifold 28 as shown at 30 (Fig. 2). The housing 29 is provided with a Venturi air intake passage 31 and with an outlet 32 leading into the manifold 28. As housing 29 and manifold 28 together provide a means for the passage of air into the engine, these members together may be considered as a manifold providing for the passage of air to the engine. It will be noted that manifold 28 is provided with branches 33, 34, and 35 and conducts air across the fuel vaporizing bowls 26ª to the intakes 25 of the engine. A flow of air is controlled by throttle valve 36 which is mounted upon a throttle valve shaft 37 operated by a lever 38.

The fuel distributor housing 29 encloses a fuel comminuting and distributing device including a cup-shaped rotatably mounted fuel container 40, having its cylindrical side wall provided with perforations 41. Container 40 is mounted upon a shaft 42 driven by an electric motor 43. Container 40 rotates within a fuel reservoir 44 which is divided substantially equally into compartments 45, 46 and 47. Compartment 45 is connected with a pipe 48 which projects down through the upper wall of branch 33 and terminates slightly above a fuel bowl 26ª. The compartment 46 is connected with a pipe 49 which projects down through the upper wall of branch portion 34 and terminates slightly above a fuel bowl 26ª. The compartment 47 is connected with a pipe 50 projecting down through the upper wall of branch portion 35 and terminating slightly above a fuel bowl 26ª.

Reservoir 60 is provided with an inlet 61 controlled by valve 62 normally held closed as shown in Fig. 1 by means of a float member 63 when the fuel level is substantially as indicated by line 64. A pipe 65 provides communication between fuel reservoir 60 and the Venturi passage 31. A needle valve 66 controlling the flow of fuel through pipe 65 is preferably set so that the proportional quantities of air and fuel drawn into the intake give the desired combustible mixture.

The operation of the invention is as follows:

The engine is cranked manually or by means of any suitable starting device such as an electric motor. In case of starting on heavy hydrocarbon fuel, the bowls may be heated in a suitable manner as by means of a gasolene burner or torch. The operation of the engine produces suction in the Venturi passage 31 causing the fuel to be drawn out of the reservoir 60 through the pipe 65 and to flow down into the fuel receiver 40. Receiver 40 is rotated by operating the electric motor 43 or the shaft 42 could be connected with a starting motor for the engine in any convenient manner so as to be operated thereby during the starting of the engine. After the engine is self-operative, it could be so arranged that the shaft 42 could be operated directly by the engine.

The vapors given off from fuel as it leaves pipe 65 are drawn through the manifold into the engine cylinders while the liquid fuel falling into the centrifugal rotor 40 is thrown out through the holes 41 in a fine spray and is further divided by impact against the wall of the centrifuge casing 44. The air currents through the rotor produced by suction of the engine on the air in the conductors 48, 49 and 50 also assists in vaporizing the fuel entering the rotor 40. The proportion of the fuel which is vaporized at the mouth of the pipe 65 depends partly upon the volatility of the fuel and the velocity of the flow.

The fuel within the container 40 will be thrown out by centrifugal force through the perforations 41 in a comminuted state and will be delivered in substantially equal amounts by the compartments 45, 46 and 47 to the pipes leading from the latter. The fuel thus comminuted and mixed with a part of the air drawn in through the intake forms a rich mixture which is delivered through pipes 48, 49 and 50 to the heated bowls 26ª. Here the fuel is further vaporized and is drawn into the intakes 25 mixed with air which passes into the pipes 33, 34 and 35, the partial vacuum in the engine assisting in vaporizing any of the fuel which passes in a state of a fine fog into the engine. The control of the fuel mixture and consequently the speed of the engine is determined by the setting of the throttle valve 36.

During the operation of the engine, the bowls 26ª are heated by the exhaust gases passing through the branch portions 26 of the exhaust header or manifold 27.

Instead of previously heating the fuel vaporizing bowls 26ª by some external means, the engine could be started by using a more volatile fuel contained in another reservoir constructed similarly to reservoir 60 shown in Fig. 1, and similarly connected with the Venturi passage 31. This lighter fuel on being drawn into a pipe similar to the pipe 65 shown in Fig. 1, would mix with the air on passing into the manifold portion 29. In case some of this lighter fuel mixture should fall down into the receiver 40, it would be comminuted and distributed in the manner described.

After the engine has been started by means of the more volatile fuel, and the fuel bowls have become heated by the engine exhaust, then the heavier fuel could be supplied to the engine in the manner described.

While the form of mechanism herein shown and described constitutes a preferred form of embodiment of the invention, it is to be understood that other forms might be adopted, all coming within the scope of the claims which follow.

I claim:

1. In a fuel distributing system for internal-combustion engines, the combination with a multi-cylinder internal-combustion engine having a plurality of intake passages; of fuel comminuting and distributing means including a rotating member throwing off a fuel spray, and compartments adapted to receive substantially equal amounts of said fuel spray directly from said member; and separate passages each connecting one of said compartments with an intake passage.

2. In a fuel distributing system for internal-combustion engines, the combination with a multi-cylinder internal-combustion engine having a plurality of intake passages; of fuel comminuting and distributing means including a rotatable fuel container having a perforated periphery for throwing off a fuel spray, and compartments for receiving substantially equal amounts of said fuel spray; and separate passages each connecting one of said compartments with an intake passage.

3. In a fuel distributing system for internal-combustion engines, the combination with a multi-cylinder internal-combustion engine having a plurality of intake passages; of a manifold having an air inlet and air passages each communicating with an engine intake passage, portion of each of said air passages being heated by the engine; fuel comminuting and distributing means; and separate passages each for receiving a portion of the distributed fuel and for delivering said fuel portion to one of the heated portions of said air passages.

4. In a fuel distributing system for internal-combustion engines, the combination with a multi-cylinder internal-combustion engine having a plurality of intake passages; of means providing air passages leading to said engine intakes, said means including portions arranged to be heated by the engine; fuel comminuting and distributing means; and separated passages each for receiving a portion of the distributed fuel and for delivering said fuel portions to one of the heated portions of said air passages.

5. In a fuel distributing system for internal-combustion engines, the combination with a multi-cylinder internal-combustion engine having a plurality of intake passages; of a manifold having a Venturi air intake passage, and having air outlet passages connected with the engine intakes; a fuel reservoir; a fuel pipe connected with the reservoir and the Venturi passage whereby fuel is drawn into said manifold by engine suction; fuel comminuting and distributing means located below the outlet of said fuel pipe to receive fuel therefrom; and fuel passages for delivering fuel from said means to parts of said manifold adjacent said engine intakes.

6. In a fuel distributing system for internal-combustion engines, the combination with a multi-cylinder internal-combustion engine having a plurality of intake passages; of a manifold having a Venturi air intake passage, and having air outlet passages connecting the engine intakes, portions of said outlet passages being arranged to be heated by the engine; a fuel pipe connected with the reservoir and the Venturi passage whereby fuel is drawn into said manifold by engine suction; fuel comminuting and distributing means located below the outlet of said fuel pipe to receive fuel therefrom; and fuel passages for delivering fuel from said means to the heated parts of said outlet passages of said manifold.

7. In a fuel supply system for an internal combustion engine having a plurality of intake ports, and exhaust ports; an exhaust heater including branch portions connected with the exhaust ports, each branch portion providing a fuel vaporizing bowl adapted to be heated by the engine exhaust; an intake manifold for conducting fluid across said bowls into the intake ports; and fuel distributing means including separate fuel passages, each for delivering fuel to a vaporizing bowl.

In testimony whereof I hereto affix my signature.

JOHN H. HUNT.

Witnesses:
  LEE T. HOLLEN,
  C. D. MILLER.